US005503271A

United States Patent [19]

Lynch

[11] Patent Number: 5,503,271

[45] Date of Patent: Apr. 2, 1996

[54] ELECTRIC METER CASE

[76] Inventor: Ted Lynch, 10655 Phelan Rd., Phelan, Calif. 92371

[21] Appl. No.: 325,577

[22] Filed: Oct. 19, 1994

[51] Int. Cl.[6] .......................... B65D 85/38; G01D 11/24; G01P 1/02

[52] U.S. Cl. ............................ 206/305; 73/431; 324/156; 361/659

[58] Field of Search .................................... 206/305, 328, 206/334, 701, 722; 324/156; 73/431; 361/659, 664–667

[56] References Cited

U.S. PATENT DOCUMENTS

| | | | |
|---|---|---|---|
| 1,969,499 | 8/1934 | Bradshaw et al. | 324/156 |
| 2,513,940 | 7/1950 | Huetten et al. | 206/334 X |
| 2,517,171 | 8/1950 | Benreuter | 324/156 |
| 2,790,951 | 4/1957 | Holtz | 361/659 X |
| 3,016,132 | 1/1962 | Chaplin | 206/305 |
| 3,066,790 | 12/1962 | Armbruster . | |
| 3,136,413 | 6/1964 | Hall | 206/305 |
| 3,174,620 | 3/1965 | Edgarton | 206/305 X |
| 3,337,802 | 8/1967 | Gill | 324/156 |
| 3,482,895 | 12/1969 | Becklin . | |
| 3,636,498 | 1/1972 | McQuanie | 361/665 X |
| 3,868,853 | 3/1975 | Alinani | 73/431 X |
| 3,893,584 | 7/1975 | Ledford . | |
| 4,295,179 | 11/1981 | Read . | |
| 4,733,776 | 3/1988 | Ward . | |
| 4,765,468 | 8/1988 | Graham | 206/305 |
| 4,860,901 | 8/1989 | Hochreuther . | |
| 5,160,021 | 11/1992 | Sibley . | |
| 5,199,563 | 4/1993 | Goodman . | |
| 5,366,079 | 11/1994 | Lin et al. | 206/328 |

FOREIGN PATENT DOCUMENTS

| | | | |
|---|---|---|---|
| 0000843 | 1/1913 | United Kingdom | 73/431 |

*Primary Examiner*—Bryon P. Gehman
*Attorney, Agent, or Firm*—Gene Scott

[57] ABSTRACT

An apparatus is provided for enclosing and protecting an electric meter for storage or transport purposes. The apparatus is comprised of a base unit and a cover unit of rigid plastic that provide both shock and thermal protection to the meter. An inwardly extending ring on both the base and cover encloses the meter's flange, thus centering and immobilizing the meter in the case. Both the cover and base unit also have protruding lips of slightly different sizes so that the cover lip accepts the base lip within it. In addition, each lip is threaded, so as to attachably engage with the other and, when rotated, lock the cover, the base and the meter together.

6 Claims, 2 Drawing Sheets

ELECTRIC METER CASE

FIELD OF THE INVENTION

This invention relates generally to carrying cases and more particularly to a reusable electric meter case with a base and cover that locks a meter in place while offering shock protection and thermal protection for safer shipping, handling and storing of meters.

BACKGROUND OF THE INVENTION

Invention and use of protective carrying cases is known to the public, as there are numerous commercially available protective cases designed to house a wide variety of different equipment. Each case has a relatively unique, individualized design specific to its particular housed object. As for example, U.S. Pat. No. 5,199,563 to H. Gene Goodman introduces a cushioned camera case with a tubular body used for storage and transport of cameras. The case is made of thick, resilient material without rigid framework and has expansion sections for camera appendages and an easy-open entrance. The tubular body of the case can be cylindrical, rectangular or cubical. The expansion sections can be orifices that are elongate or shaped and positioned for access to particular camera components, thereby allowing certain use of cameras while in the camera cases. This invention can be produced for particular cameras and camcorders or for general use for cameras and camcorders and related items.

U.S. Pat. No. 4,733,776 to Keith Ward details a protective device for a remote control unit. The device includes a resilient, deformable foam panel with an arcuate curvature about a central axis in channel-like fashion. A flexible, transparent elastic member is adapted to extend across the channel opening, with a remote control device disposed within the channel opening. Hook or loop fastener patches are secured to the opposed edges of the transparent member and are engageable with like loop or hook fastener patches secured to the outer peripheral surface of the foam panel, so that the transparent member applies tension to the opposed sides of the channel opening and frictionally retains the remote control unit therein. The elasticity of the transparent member permits operation of the push buttons of the remote unit, while the foam material cushions the unit and prevents damage.

Another protective cover is introduced in U.S. Pat. No. 5,160,021 to Barry Sibley. This cover is a container for the transport of diagnostic specimens or dangerous substances. This container for packaging vials includes an open-topped plastic cylinder with an integral bottom wall having an upper section of the side wall which is of a reduced diameter and includes opposed outwardly projecting lugs for engaging complementary slots in a cylindrical cap for the container. The upper section of the side wall further includes a radial groove which accommodates an elastic O-ring for providing a leak proof seal for the container. The cap slides over the upper section of the side wall and sealingly engages the O-ring to provide a leak-proof seal. The container is further provided with an open celled plastic foam insert which is die-cut to accommodate up to three vials.

U.S. Pat. No. 4,295,179, issued to Clifford Read, details a waterproof housing for electrical or electronic test equipment. The housing has an opening at the rear for equipment and a flap at the front for operation or viewing instruments of the equipment. The flap is hinged upwardly to open and close an aperture. Movement of the flap is frictionally resisted to allow it to be located in any desired position. With the flap closed, a gap is formed between the flap and the housing for passage of wiring from the equipment. Preferably, the housing has inner and outer skin layers which are relatively resiliently moveable and a compressible foam may be between skin layers.

As stated above, these and numerous other patents offer similar protective cases for housing various devices. However, while each is relevant to its own specific object, none can effectively protect and enclose the object of the present invention; electric meters.

U.S. Pat. No. 3,893,584 to Jonathan Ledford presents a utility meter container for the accommodation of electric, gas, water and telephone meters. This container is installed to fully cover a working meter, and includes provisions to temporarily remove the container cover to allow for the reading of the meters. The container is made of simple, lightweight and economical construction consisting of three shell formed plastic pans that, in the unassembled mode nest into each other for storage and shipment. The top and the bottom half of the container body are permanently fastened together in place by means of blind rivets or bolts in the adjoining flanges of the two pans. A removable cover fits into the top of the unit, the cover being latched to the unit so that it may be temporarily removed when a specially shaped key is inserted into the cover. During such temporary removal, the cover remains fastened to the key.

While this invention is specifically designed to house electric meters, it is significantly different from the present invention. The present invention is designed to protect meters while they are being stored or transported, while Ledford's device is utilized for covering meters while they are in use.

The present invention also has several features that neither this nor any of the other prior art contains. First of all, the present invention is composed of a thick plastic that provides both shock protection and thermal protection for the meter. Secondly, the present invention contains a system to secure the case to the meter. Both a base and a cover of the present invention are constructed so that a flange around the base of the meter is positioned between two rings and thereby locked firmly to the cover. Thus, the meter is stabilized in the case and cannot move while contained within the case. Furthermore, to lock the present invention so that the cover cannot accidentally become dislodged, the base and cover contain interlocking screw threads that engage and lock the cover to the base.

Thus, none of the prior art is able to protectively cover an electric meter for storage and transport, and none of the prior art includes the above related locking feature. The present invention fulfills these needs and provides further related advantages.

SUMMARY OF THE INVENTION

The present invention is a case for carrying and protecting an electric meter during storage and transport. The case is reusable, being composed of a rigid plastic base and a cover, both of which are lightweight yet tough. The base and cover are further designed to provide shock protection and thermal protection for the meter, thus protecting it from external forces and weather conditions.

The base unit is an approximate circular disk fabricated of a thin wall plastic sheet which is molded to shape. An upfacing horizontal annular ring of the base unit is designed to support a flange of the electric meter which is rested upon it. The ring is integrally joined to a vertical annular wall having a diameter just large enough to accommodate the meter flange. An opening at the center of the ring provides space which is normally required for electrical terminals of the meter which extend downwardly. When the meter is placed on the base unit, a bottom surface of the meter flange rests on the ring and is positionally centered by the annular wall.

The cover is an elongated cylinder with a top closed end providing a carrying handle, and an open bottom end for attachment to the base unit. A downfacing annular inner ring of the cover unit extends inwardly far enough to contact the meter flange on its top surface and to act as a positional centering means for the meter itself. The base unit and the cover each have mating screw threads for engagement and locking the cover onto the base unit, and for further providing clamping action on the meter flange. The base unit and cover further each have at least one radially positioned, outwardly extending fin convenient for gripping and manipulating the cover and base into the locked and alternately the unlocked position.

Therefore, it is an object of the present invention to provide a sturdy case in which to store or transport an electrical meter. It is a further object of the invention to provide both shock protection and thermal protection to the meter, thus protecting the meter from damage. It is yet another object of the invention to provide a case made of a lightweight yet rigid, protective material so that the case is at once sturdy and easy to handle. It is a further object of the present invention to provide a handle for convenient carrying and transport of the case. It is yet another object to be manufactured in different colors, so that a color coding system for easy identification can be utilized. Still further, it is an object of the present invention to be durable, and therefore reusable.

It is yet another object of the invention to provide a means for centering and locking the case to the meter so that the meter is stabilized and immobilized within the case. It is still a further object of the invention to allow the cover to be locked to the base unit, thus preventing the cover from inadvertently coming loose during storage or transport. This is accomplished by means of the interfacing threads on both the base and the cover.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
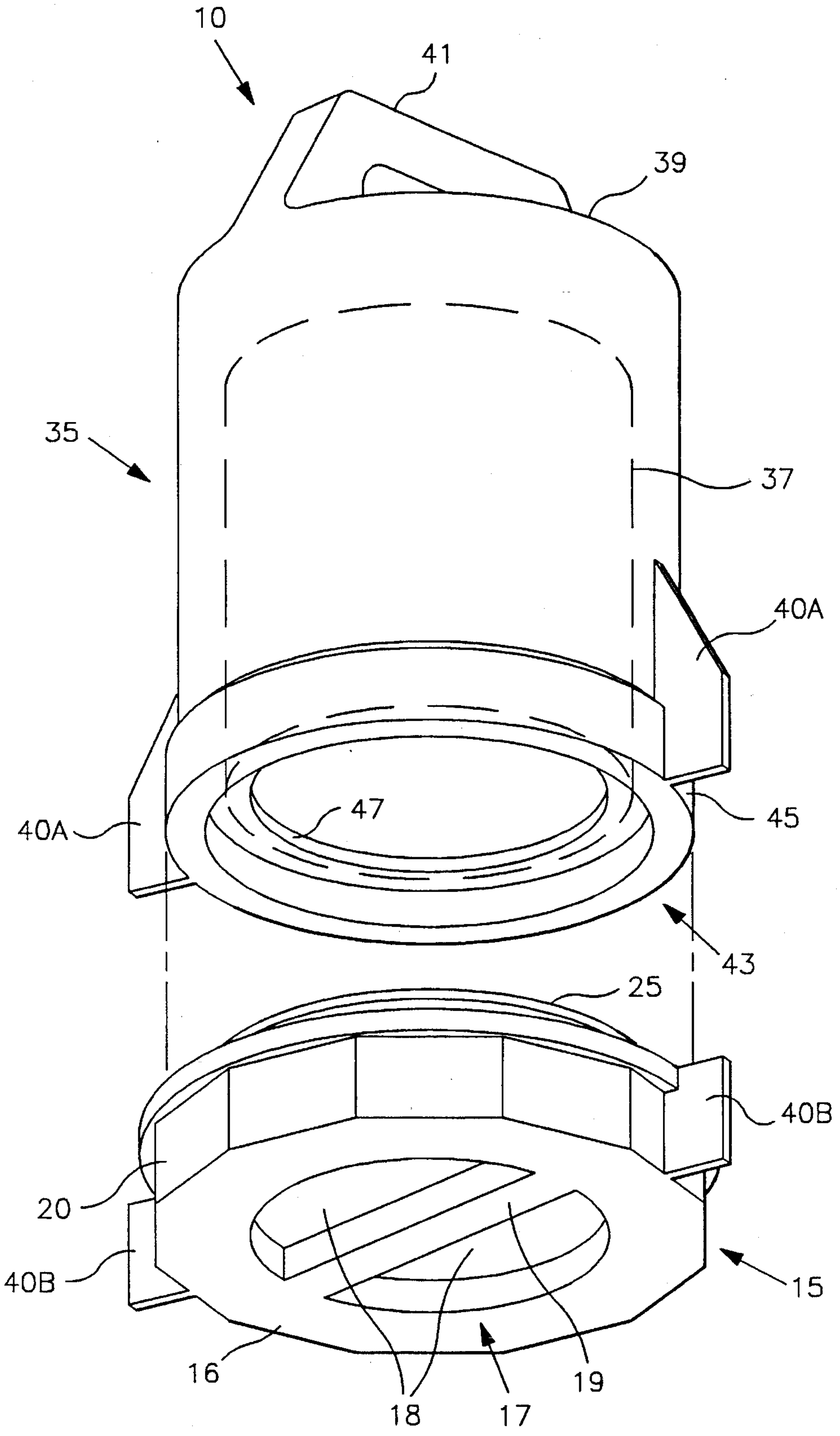
FIG. 1 is a perspective view of the meter case, showing the individual base unit and cover portions of the case.
Figure 2:
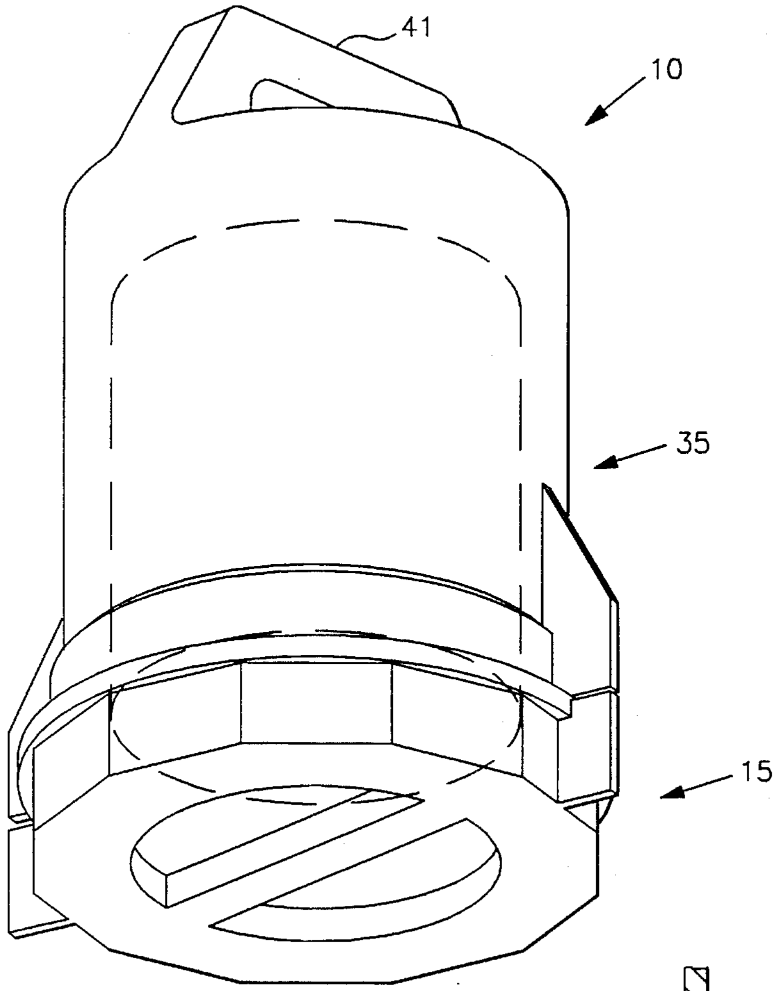
FIG. 2 is a perspective view of the meter case, showing the base and cover portions of the case interconnected.

FIGS. 1 and 2 show a carrying case 10 for an electric meter 6. The case 10 is constructed so that the electrical meter 6 with an annular horizontal flange 7 can be centered, secured, and immobilized within the case 10. The main components of the case 10 are a base unit 15 and a cover 35, which can be locked together to further ensure the safety of the meter 6.

The base unit 15 is integrally formed of a sheet material, preferably rigid plastic. The sheet material is molded so as to provide a bottom rest surface 16, an upwardly extending polygonal side surface 20, a further upwardly extending annular threaded base lip 25 and a horizontal annular base ring 27. The bottom rest surface 16 integrally includes a gripping means 17. Preferably, the gripping means 17 is composed of a pair of indented portions 18 separated by a partition 19. The partition 19 is of a size for convenient hand gripping. The polygonal side surface 20 is also designed to provide improved gripping of the base unit 15. However, while this is the preferred embodiment, any other similar configurations may be utilized to provide a like gripping means and surface.

The base lip 25 extends upwardly from the side surface 20. An outwardly facing edge of the annular base lip 25 contains a screw thread 26 while an inward facing edge 28 extends downwardly to the annular base ring 27. The base ring 27 extends horizontally inward, and it is on this base ring 27 that the meter flange 7 rests. The base ring 27 extends inward to provide ample support to the meter 6, and then terminates centrally to form a circular opening 29. The circular opening 29 provides access into an interior space 31 within the base unit 15. This space 31 is essential for accommodating the vertically downward extending electrical terminals 8 of the meter 6.

The integrally formed cover portion 35 of the case 10 has an elongated cylindrical wall 37 with a top closed end 39 that provides an integrally foraged carrying handle 41. The cover 35 also has an open bottom end 43 that accepts the meter 6 within it. The cylindrical wall 37 is of a shape and size to house the meter 6 within the cover 35. The cover's open bottom end 43 has an annular cover lip 45. An inner edge of the cover lip 45 contains a screw thread 46. The cover lip 45 further includes a horizontal annular cover ring 47 that extends inwardly from the cylindrical wall 37. The cover lip 45 extends vertically downward below the cover ring 47.

Both the cover 35 and the base 15 further include at least one radially positioned, outwardly extending fin comprising an upper fin 40A integral with the cover 35 and a lower 40B integral with the base unit 15. The fins 40A and 40B are externally integrally mounted, and of a size so as to enable hand leverage in tightening and loosening the cover 35 on the base unit 15. When the cover 35 is locked to the b6ase 15, the fins 40A and 40B are vertically aligned with each other.

Figure 3:
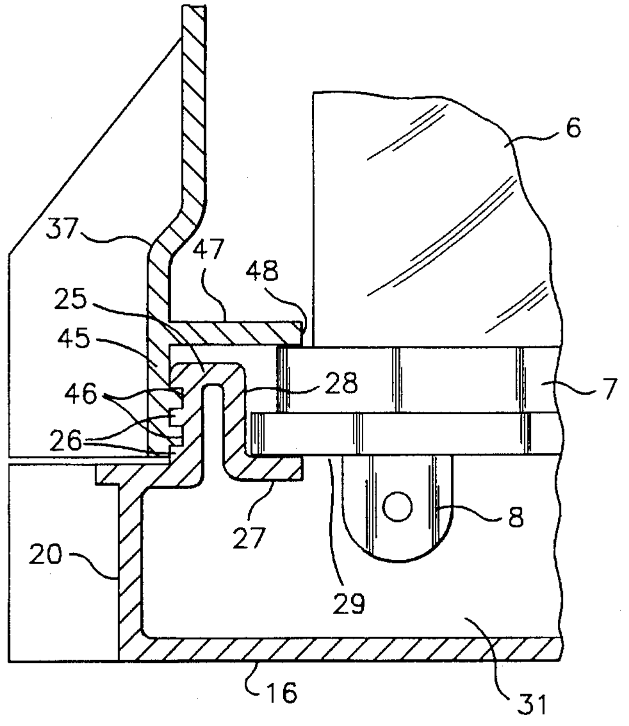
FIG. 3 is a partial cross-sectional view along line 3—3 of the base unit and cover locked together, showing the means for securing the meter flange in the case and the means for locking the cover to the base.

Thus, when it is desired to enclose an electrical meter 6 within the case 10, the meter is positioned on the base portion, as seen in FIG. 3. The annular base lip 25 provides the circular inward facing edge 28 that centers the meter's flange 7 on the base ring 27. Thus, the meter's flange 7 can be centered within the perimeter of the annular base lip 25, with its electrical terminals extending downwardly through the base opening 29 and into the center hollow space 31, thereby centering and stabilizing the meter 6 within the base unit 15.

Once the meter 6 is positioned onto the base unit 15, the cover 35 can be put in place. The cover's open bottom end 43 must be centered over the meter 6 and slid down its length until the cover 35 contacts the base 15. The annular cover lip 45 is slightly larger than the annular base lip 25, so when the cover 35 contacts the base 15, the inner edge of the cover lip 45 contacts the outer edge of the base lip 25. The upper and lower fins 40A and 40B are then employed to rotate the cover 35 so that each lip's screw threads 46 and 26 respectively engage with each other and, after a 90 degree rotation, the screw threads 46 and 26 are fully engaged, thus firmly locking the cover 35 and the base 15 together.

Furthermore, the base unit 15 and the cover 35 are sized and configured so that when the annular threaded cover lip 45 is fully engaged with the annular threaded base lip 25, not only is the cover 35 locked to the base 15, but the meter 6 is also locked to the case 10 between the annular cover and base rings 47 and 27. When the lips 45 and 25 are fully engaged, the cover ring 47 extends inward, over the top surface of the meter flange 7, thus sandwiching the flange 7 between the cover ring 47 and the base ring 27. As a further centering and securing means, the annular cover ring 47 provides a circular inner cover ring edge 48 that positions the electrical meter 6 centrally within the case 10.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A carrying case capable of holding an electric meter having an annular horizontal meter flange, the case comprising:

an integrally formed base unit of a sheet material, providing a bottom rest surface, an upwardly extending polygonal side surface and a further upwardly extending annular threaded base lip surrounding an horizontal annular base ring terminating centrally to form a circular opening providing access into an interior space within the base unit, the annular base ring of a size and extent for resting the meter flange thereon;

an integrally formed cover having an elongated cylindrical wall with a top closed end providing an integrally formed carrying handle, and an open bottom end having an annular threaded cover lip engaging the base lip and further including a horizontal annular cover ring extending inwardly from the cylindrical wall;

the base unit and the cover sized and configured so that with the annular threaded cover lip fully engaged with the annular threaded base lip, the meter flange is sandwiched between the annular base ring and the annular cover ring and placed in compression thereby, the polygonal side surface providing improved gripping of the base unit during removal of the cover.

2. The case of claim 1 wherein the annular cover ring provides a circular inner cover ring edge positioned for centering the electrical meter within the case.

3. The case of claim 1 wherein the annular base ring provides a circular inner base ring edge positioned for centering the electrical meter within the case.

4. The case of claim 1 wherein the base further includes a gripping means formed integrally within a bottom rest surface.

5. The case of claim 4 wherein the gripping means is a pair of indented portions in the bottom rest surface separated by a partition of a size for convenient hand gripping.

6. The case of claim 1 further including at least one pair of radially positioned, externally integrally mounted, and outwardly extending fins comprising an upper fin integral with the cover and a lower fin integral with the base unit, the fins being of a size enabling hand leverage in tightening and loosening the cover on the base unit.

* * * * *